INVENTORS
WILLIAM J. ALBRECHT
&
EVERETT S. MINARD
ATTORNEY

Jan. 15, 1963 W. J. ALBRECHT ET AL 3,073,359
VALVE CONTROL MECHANISM FOR RECEPTACLE FILLING MACHINES
Filed Feb. 26, 1959 5 Sheets-Sheet 2
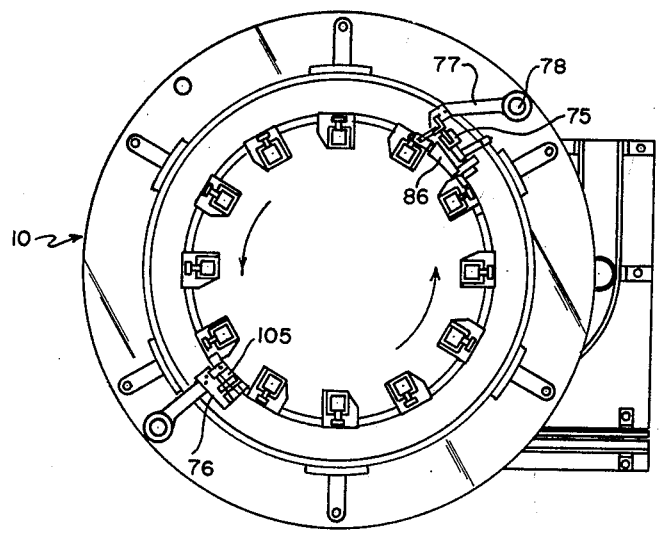
FIG. 2
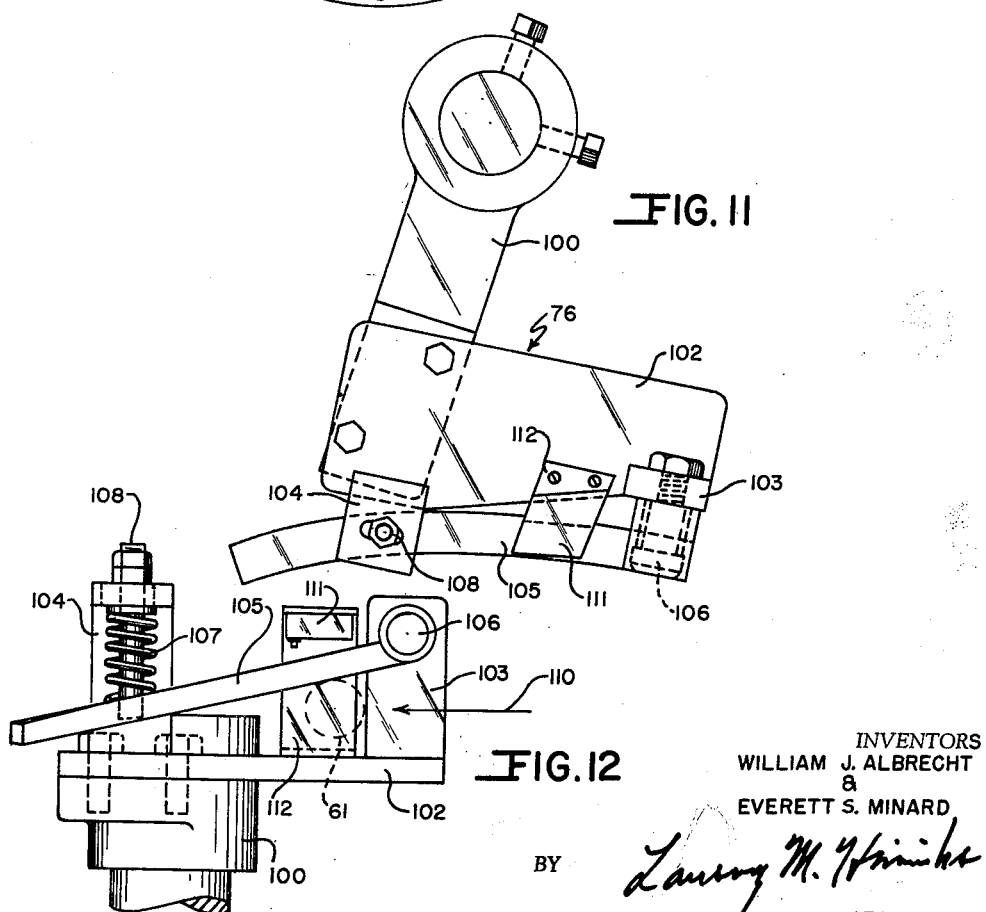
FIG. 11
FIG. 12
INVENTORS
WILLIAM J. ALBRECHT
&
EVERETT S. MINARD
BY
ATTORNEY Jan. 15, 1963   W. J. ALBRECHT ET AL   3,073,359
VALVE CONTROL MECHANISM FOR RECEPTACLE FILLING MACHINES
Filed Feb. 26, 1959   5 Sheets-Sheet 3
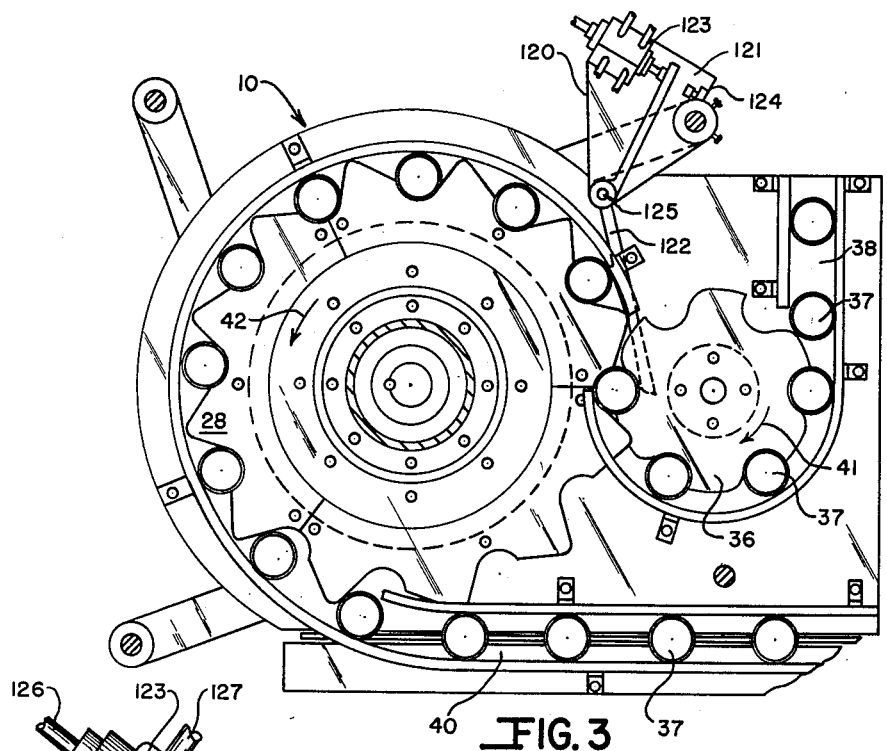
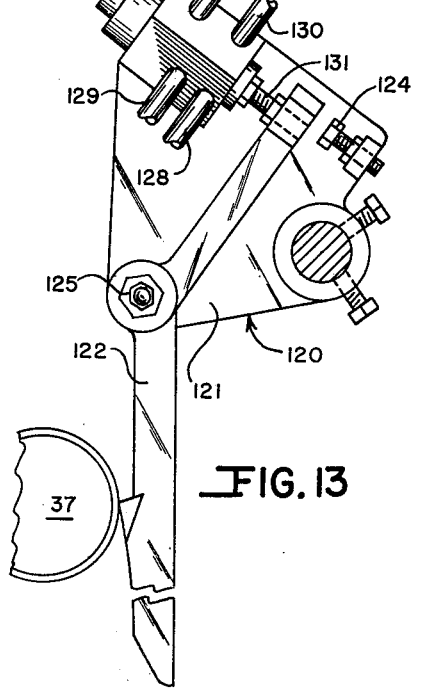
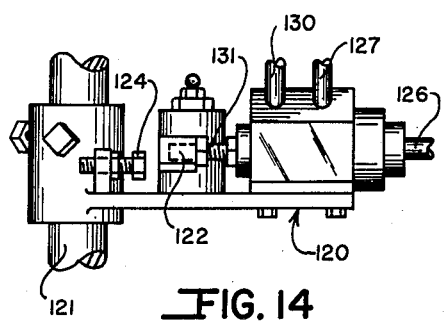
*INVENTORS*
WILLIAM J. ALBRECHT
&
EVERETT S. MINARD
BY *Lansing M. Hinisker*
ATTORNEY

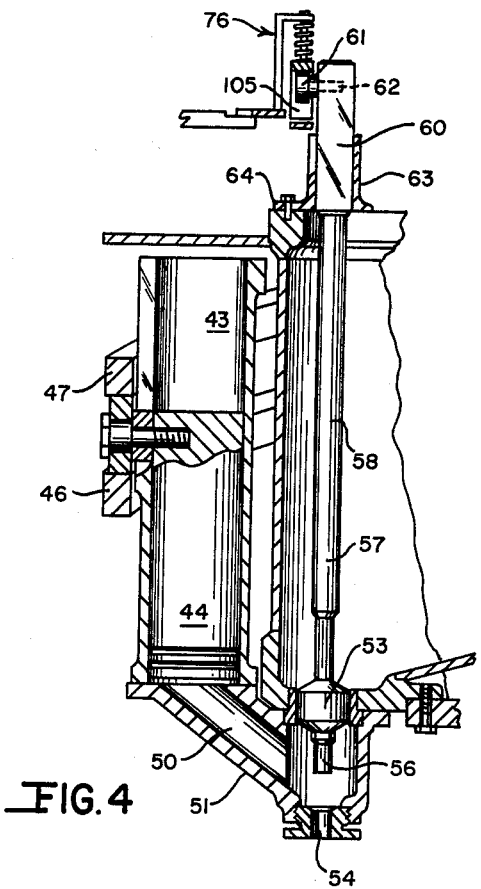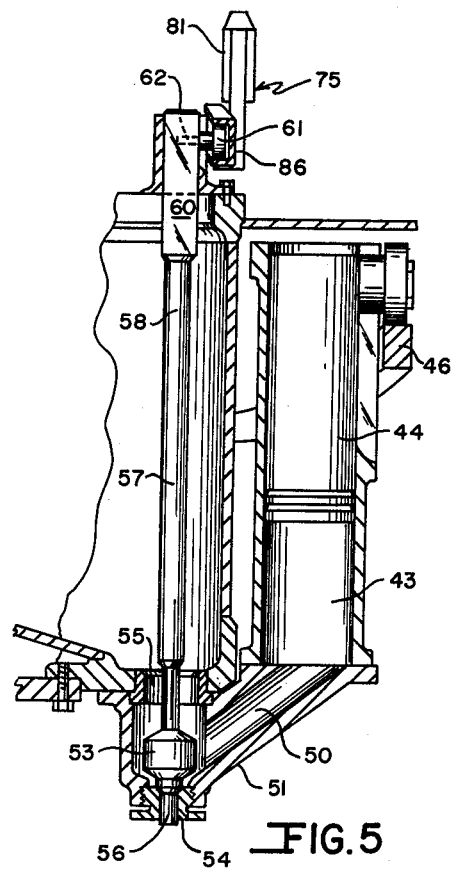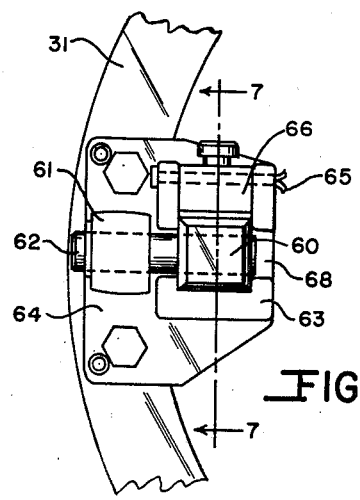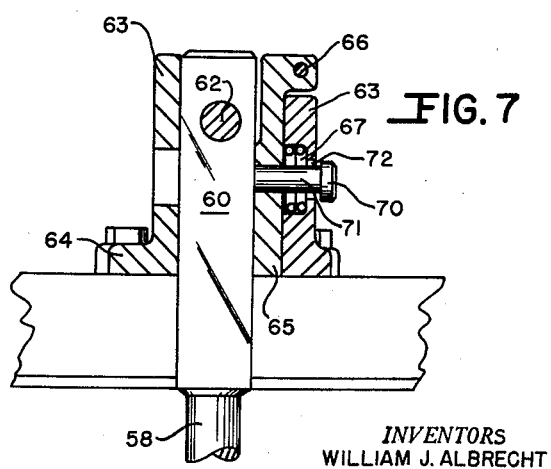

United States Patent Office 3,073,359
Patented Jan. 15, 1963

3,073,359
VALVE CONTROL MECHANISM FOR RECEPTACLE FILLING MACHINES
William J. Albrecht, Louisville, Ky., and Everett S. Minard, Laguna Beach, Calif., assignors to Chemetron Corporation, Chicago, Ill., a corporation of Delaware
Filed Feb. 26, 1959, Ser. No. 795,711
6 Claims. (Cl. 141—142)

This invention relates generally to receptacle filling mechines and more particularly to an improved valve control mechanism for automatically operating filling control valves in proper timed sequence and for preventing operation of the valves except when containers to be filled are fed into the filling machine.

This invention is concerned with a no-can-no-fill valve control mechanism especially adapted for use in filling machines of the kind disclosed in the co-pending application of Everett S. Minard, S.N. 559,229 filed January 16, 1956, for Container Filling Machine, now Patent No. 2,896,676 issued July 28, 1959, reference to which is hereby made. Although the valve control mechanism of the present invention is described herein as utilized in connection with a piston-type rotary filling machine, it will be appreciated by those familiar with the art that this mechanism can be utilized to advantage upon other types of filling machines such as gravity fill and pocket fill types of machines.

In recent years considerable efforts have been made to achieve higher and higher filler operating speeds expressed in terms of containers filled per minute by a single machine with the result that very high speed filling machines have come to replace the somewhat simpler low-speed machines which have previously been used. As the speed of a filling machine is increased, it becomes more and more important that it operate in a fully automatic fashion, for the vigilance of the operator can not be relied upon to stop or otherwise control the operation of the machine in the event of malfunctioning. The valve control mehcanism of the present invention is particularly well adapted for use in very high speed filling machines.

One object of this invention is to provide a valve control apparatus for a rotary type filler which will accurately position a reciprocable fill control valve associated with each of a plurality of filling stations so as to open the valve when an empty container is disposed below the filling station and to close the valve when the particular container has been filled to the proper level so that the container can be automatically removed and replaced by another empty container during the time the valve is closed.

Another object is to provide a valve control mechanism which will take cognizance of the fact that an empty container is not present beneath a particular filling station in the event of failure of the supply of empty containers and which will not operate the control valve under such circumstances, thus preventing the product being filled from being discharged from a particular filling station when there is no container to receive it.

A further object is to provide a valve control apparatus that is entirely foolproof in that provision is made for accommodating sticking valves, as from time to time may occur, the arrangement being such that a sticking valve will be readily compensated for and will not cause damage to the valve control mechanism or other portions of the filling machine.

A further object is to provide a valve control mechanism which is relatively easy to disassemble for cleaning purposes and which is simple to manufacture and maintain in service.

Other objects and advantages of this invention will present themselves to those familiar with the art upon reading the following detailed specification in conjunction with the drawings and appended claims.

Referring to the drawings,

FIG. 2 is a top plan view of the filler of FIG. 1;

FIG. 3 is a horizontal section taken on line 3—3 of FIG. 1;

FIG. 4 is an enlarged vertical section showing the details of the filler valve and the filling piston mechanism with the valve in the open position and just about to close;

FIG. 5 is an enlarged vertical section showing the details of the filler valve and the fiilling piston mechanism with the valve in the closed position and just about to open;

Figure 8:
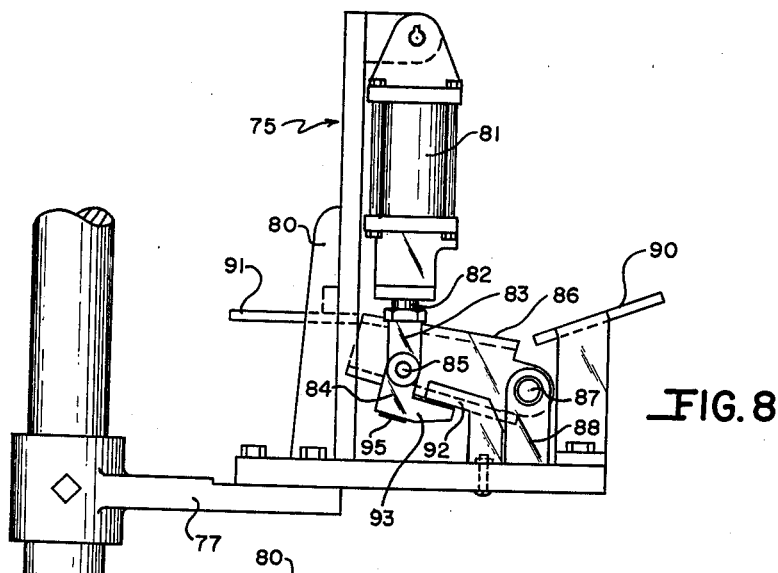
Figure 9:
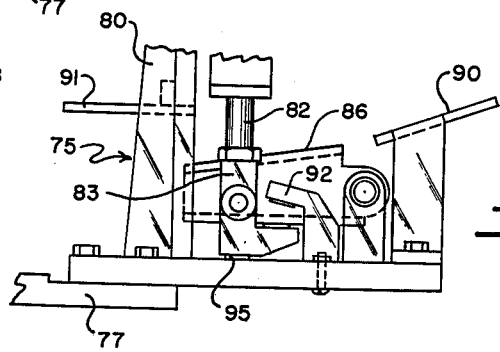
Figure 10:
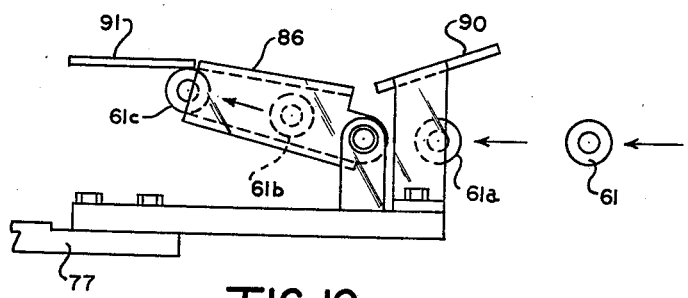

FIG. 6. is an enlarged top view of the valve retaining mechanism;

FIG. 7 is a vertical section taken along line 7—7 of FIG. 6;

FIG. 8 is an enlarged side view of the valve opening mechanism with the parts shown in such position as to move the valve control rollers to the open position;

FIG. 9 is a view similar to FIG. 8 but with the mechanism shown in such position as not to move the valves to open position;

FIG. 10 is a simplified view showing sequentially the position of a valve control roller as it approaches and passes through the valve opening mechanism;

FIG. 11 is an enlarged top plan view of the valve closing mechanism;

FIG. 12 is an enlarged side view of the valve closing mechanism;

FIG. 13 is a plan view of the container detecting mechanism; and

FIG. 14 is a side view of this mechanism.

*General Description of the Filling Machine*

In order to understand the valve control mechanism of this invention it is necessary first to have an understanding of a typical rotary filler representative of the kind of filling machine in which the valve control mechanism may be incorporated.

Figure 1:
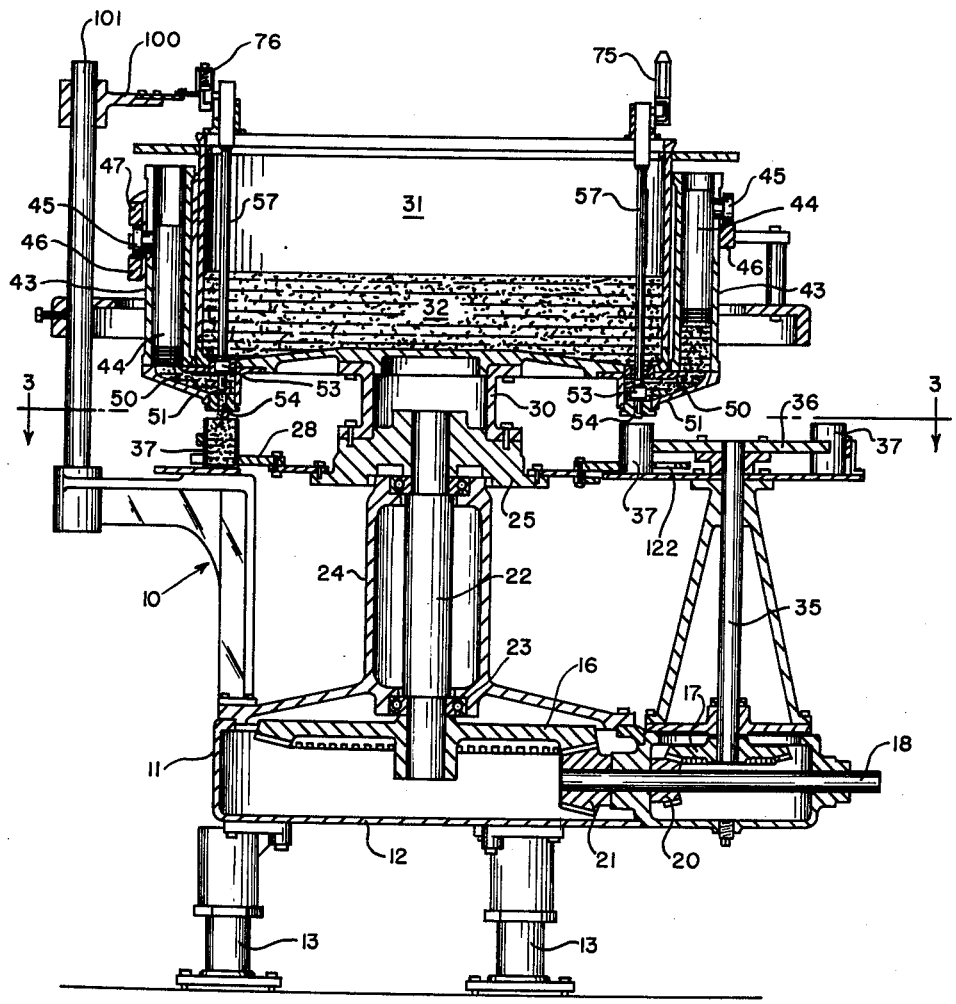
FIG. 1 is a vertical sectional view of a rotary piston type filler equipped with the valve control mechanism of this invention.

As shown in FIGS. 1 and 2 the filling machine 10 consists of a stationary base assembly 11 comprising a gear case 12 supported on legs 13 and containing drive gears 16 and 17. These gears are in turn driven by drive shaft 18 through spur gears 20 and 21. The drive gear 16 in turn drives vertical shaft 22 journalled in suitable bearings 23 carried by cover element 24. The upper end of shaft 22 rotatably supports member 25 to which is attached container conveying star 28 and reservoir supporting pedestal 30. At the upper end of pedestal 30 there is provided a reservoir 31 for receiving the product to be filled 32.

Vertical shaft 35 driven by gear 17 drives a container feed star 36, the purpose of which is to feed containers 37 from in-feed conveyor 38 (FIG. 3) into main container conveying star 28. The containers 37, as best shown in FIG. 3, are carried around the filler 10 by main conveying star 28 and leave by exit conveyor 40. In FIG. 3 arrows 41 and 42 indicate the directions of rotation of the stars 36 and 28 respectively.

Reservoir 31 is provided with a plurality of filling station cylinders 43 disposed about its circumference. Each cylinder 43 is provided with a reciprocable piston 44 for the purpose of pumping the product to be filled 32 from reservoir 31 into containers 37. For this purpose pistons 44 are reciprocated vertically once each revolution of the reservoir 31 by interaction of rollers 45 and cam rails 46 and 47. Rail 46 is esentially circular and describes a full circle with a high point disposed on the right hand side of FIG. 1 and a low point at the left hand side. Rail 47 describes only a semi-circle the latter operating to force the rollers downwardly to accomplish a downward stroke of piston 44 during which the product is pumped from cylinder 43 into container 37. Cam rail 46 performs the dual function of lifting pistons 44 during one-half a revolution to cause the product to be aspirated into cylinders 43 and also as a limiting stop preventing too rapid and too great downward travel of pistons 44.

The lower portion of each cylinder 43 is in communication with the interior of the reservoir 31 through passageways 50 formed in castings 51 which are attached to the bottom of the reservoir 31 and support the cylinders 43. Flow of the product to be filled 32 through passageways 50 and into containers 37 is controlled by filling valves 53.

Filling Valve Action

The filling valves 53 are adapted for reciprocable movement from an uppermost position as illustrated in FIG. 4 and at the left hand side of FIG. 1 to a lowermost position as illustrated in FIG. 5 and at the right hand side of FIG. 1. When in the raised or uppermost position, the interior of the cylinder 43 is in communication with the filling nozzle 54 as shown in FIG. 4, and product beneath the piston 44 is free to flow downwardly through passageway 50 into container 37. When the valve 53 is in the lowered position, product 32 is able to flow from reservoir 31 through port 55 and passageway 50 into the space beneath piston 44 in cylinder 43. When the valve 53 is in the lowermost position, valve extension 56 closes port 54 and prevents product from passing therethrough. It should be noted that the sides of valve 53 and the sides of extension 56 perform a guiding function in addition to their sealing functions. The length of extension 56 is such that it remains engaged in nozzle 54 until the sides of the valve member 53 are received into port 55 as the valve assembly is raised. Thus, for a short interval during movement of the valve assembly from one position to another, both openings 55 and 54 are closed. However, the valve timing is so adjusted with respect to the movement of pistons 44 that the pistons are stationary during movement of the valves through the position where ports 54 and 55 are both closed. By this arrangement the lower ends of the valve assemblies 57 are always supported in proper alignment without the need for spacers or cages. Moreover, the valve extension 56 performs an additional function in that it projects all the way to the bottom of nozzle 54 in the lowermost position and effectively clears nozzle 54 of product with each reciprocation of the valve assembly 57. This facilitates delivery of accurate quantities to the individual containers 37.

Filling Valve Control Mechanism

Each valve assembly 57 comprises, in addition to the valve member 53 and valve extension 56 described above, a valve stem 58, a square shank 60, a cam roller 61 and associated pin 62. The square shanks 60 of the valve assemblies 57 are slidably received in brackets 63 bolted to the top of reservoir 31 as is best shown in FIGS. 6 and 7. Each bracket 63 comprises a flange-like base portion 64 and an upstanding portion generally in the shape of a hollow rectangle. A pressure plate 65 is pivotally supported by a cotter pin 66 at the top of each bracket 63 and is biased inwardly against the shank 60 of valve assembly 57 by a coil spring 67. Thus the pressure plate continually exerts lateral pressure upon the shank 60 and retains it tightly in position within bracket 63. The spring pressure is such that the frictional forces exerted against the sides of shank 60 is more than sufficient to maintain the valve assembly in raised position against the force of gravity. By this arrangement the valve assembly 57 will remain in any selected vertical position unless and until positively moved from this position to another, as will be described later.

The valve retaining mechanism and valve assemblies 57 are capable of being readily disassembled for cleaning. To remove the valve assemblies one has merely to grasp each valve assembly by the stem portion and move it upwardly until the entire shank 60 is above the bracket 63. This frees the lower end of the assembly by withdrawing both valve 53 and valve extension 56 from port 55. To permit removal of the raised assembly 57, there is provided a slot 68 (FIG. 6) through the side of each bracket 63 which is wide enough to permit lateral movement of the stem 58 therethrough. The complete valve assembly may then be lifted away from the filler 11. It should be noted that the two valve assemblies pictured in FIGS. 1, 4 and 5 are not free to be lifted upwardly for removal due to the presence of valve control structure. However, the remaining valve assemblies of the filler may be quite readily removed since the control structure is confined to the two diametrically spaced locations as is shown in FIG. 2.

To remove the pressure plates 65 the cotter pins 66 are first removed. When this is done, the plates may be lifted slightly to align the round eccentric heads 70 of pins 71 with openings 72 in the sides of brackets 63. The openings 72 are large enough to pass heads 70 and permit removal of plates 65. However, with the pins 66 in place the misalignment of the heads 70 and openings 72 is such that the heads 70 serve as limit stops and prevent excessive inward movement of plates 65 when the valve assemblies 57 are removed.

To actuate the valves from one position to another a valve raising assembly 75 (FIG. 5) and a valve lowering assembly 76 (FIG. 4) are employed. The angular location of these assemblies with respect to other parts of the filler is best shown FIG. 2.

Valve Lifting Assembly

The details of the valve lifting assembly are best shown in FIGS. 8, 9 and 10. The assembly 75 is supported upon a bracket 77, adjustably supported upon vertical rod 75. Bracket 77 carries a second bracket 80 which pivotally supports an air cylinder 81 at its upper end. The movable piston of this cylinder is attached to rod 82 which projects through the bottom of cylinder 81. The end of this rod carries a yoke 83 which is pivotally connected to a stop member 84 by pin 85. Stop member 84 is fixed to pivoted chute cam 86. The opposite end of chute cam 86 is supported by pin 87 carried by lug 88. Thus the chute cam is movable to either the raised position shown in FIG. 8 or the lowered position shown in FIG. 9 by the action of air cylinder 81. It is to be understood that any other conventional motor means such as a solenoid may be substituted for air cylinder 81, if desired.

Chute cam 86 is U-shaped in section, the back side as shown in FIG. 8 which faces toward the reservoir 31 being open to receive the cam rollers 61 on the valve assemblies 57 as the reservoir rotates. The direction of rotation is such that the rollers approach from the right hand side as shown in FIG. 10 and enter this end of the chute cam 86. In normal operation the rollers 61 will be in the position shown at the right of FIG. 10 as they approach the assembly 75. They are in this position when the valve assemblies are at their lowermost positions. In the event a valve assembly is raised, its roller will approach in a higher position and would not enter the open end of chute cam 86. To prevent this a lowering cam surface 90 is provided to cam the roller and associated valve downwardly to the fully lowered position.

The normal position of the chute cam 86 is raised, as shown in FIGS. 8 and 10, and in this position it elevates each roller 61 and associated valve assembly 57 as the roller passes through the cam 86, the action being as shown in FIG. 10 by the sequence of rollers 61a, 61b and 61c. If the air cylinder 81 is not pressurized in such manner as to raise rod 82, as is the case when the no-container-no-fill mechanism is activated, the chute cam 86 is in the position shown in FIG. 9. In such case the valve rollers 61 merely pass straight through without being raised and the filler valves remain lowered. This prevents the product 32 from being pumped through nozzles 54 disposed above locations on star wheel 28 where no containers are located and prevents loss of product and soiling of the machine. Moreover, as the pistons 44 are moved downwardly with the nozzles 54 closed by valve extensions 56, the product is merely pumped back into reservoir 31 through passageway 50 since the port 55 is open when nozzle 54 is closed.

If the no-container-no-fill device should pressurize the air cylinder 81 to raise the chute 86 during the time a roller is contained in the chute 86, the roller and its associated valve assembly will be pulled upwardly with the chute 86 to the raised position. To prevent the roller from being thrown upwardly higher than the proper upper position, a plate 91 carried by bracket 80 is provided. This plate will engage the emerging roller 61c if it tends to fly higher than the exit of the chute cam 86 and prevent further upward movement. The raised position of chute cam 86 is controlled by stop 92 which interacts with a projection 93 on yoke 84. Another stop 95 on the bottom of yoke 84 prevents excessive downward movement.

As has been described, the normal position of chute cam 86 is the raised position, and it is only when the non-container-no-fill mechanism operates that the cam 86 is lowered. Thus with proper continuous supply of containers the filler can operate all day without chute cam 86 being lowered. On the other hand should the supply of containers fail, even momentarily, the chute cam will move to a lowered position to prevent discharge of the product from the filling station which does not contain a container. Moreover, should the control air fail, the reaction of rollers 61 and shank 60 friction will lower the chute cam 86 and the device will "fail safe."

It should be noted that the right hand end of chute cam 86, as viewed in FIG. 9, is wider than the opposite end. This is done not only to facilitate entry of the rollers 61 but also to prevent damage to the valve assemblies incurred by slamming valve 53 against nozzle 54 should air cylinder 81 be actuated downwardly while a roller is within the chute cam 86. By sloping the upper face of this cam with respect to the horizontal a roller 61 will not be moved all the way down unless it is at the extreme exit end of the cam chute 86 and the operation of air cylinder 81 in a properly operating machine will occur prior to the time roller 61 reaches this position.

*Valve Lowering Mechanism*

The valve lowering mechanism 76 is located diametrically opposite the valve lifting assembly 75, and its function is to lower each individual valve after the associated piston 44 has completed its downward stroke and delivered a measured charge of product 32 to a container 37.

As shown in FIGS. 1 and 11 the lowering mechanism is supported upon a bracket 100 secured to a vertical post 101. This bracket in turn supports a casting 102 having upstanding lugs 103 and 104. Lug 103 serves as a pivot support for cam bar 105 which is attached by means of pivot pin 106. The movable end of cam bar 105 is urged downwardly by spring 107 supported about pin 108 carried by lug 104. The operation of the valve lowering mechanism is best illustrated in FIG. 12. The valve rollers 61 approach in the direction indicated by arrow 110 and when the valve assemblies 57 are in the raised position, the centers of the rollers are level with arrow 110. Thus as the rollers 61 contact cam bar 105, they are moved downwardly until the valve assemblies 57 are pushed to the lowermost position, spring 107 being of such strength as to exert a greater force than the resistance to downward movement exerted by the frictional forces on the shanks 60 of the valve assemblies.

In the event a valve is encountered which is jammed or so badly stuck in the raised position that it will not move to lowered position, the force of spring 107 is overcome and cam bar 105 is moved upwardly by the action of the roller 61 to actuate switch 111 supported by bracket 112. This switch is connected into the drive motor control circuit and operates to stop the drive motor (not shown) and apply a mechanical brake (not shown) when cam bar 105 rises sufficiently to engage switch 111. When the power to the drive motor is cut off and the mechanical brake is applied, the filler will coast to a stop in less than a half revolution of the reservoir 31 so that the stuck valve assembly's roller 61 will not damage the valve lifting assembly 75.

Spring 107 also performs an additional function as a lost motion device in that it will be compressed slightly as each valve assembly reaches the bottom of its stroke to accommodate for slight differences in dimensions and uneven wear. The location of switch 111 is such, however, that the switch will not be actuated by such slight compression of spring 107.

On the other hand if a valve is stuck in the lowered position as it approaches the lowering device, it will merely pass beneath cam bar 105 without being moved. When such a valve approaches the valve lifting assembly, it will properly enter chute cam 86 but it may not be lifted by the action of the chute cam. When this occurs, the air in air cylinder 81 is compressed as the chute cam 86 moves to the lowered position shown in FIG. 9. By utilizing air of only moderate pressure in cylinder 81 this downward movement may be accomplished without damage to the filler machine and the only consequence of the stuck valve is a container which is not filled. Such a container can be easily detected and removed later in the packing process because of its light weight.

*Container Detecting Mechanism*

The container detecting mechanism 120 is located directly beneath the valve lifting assembly 75 on the level of star wheels 28 and 36. This mechanism 120 is best shown in FIGS. 3, 13 and 14. It comprises a mounting plate 121, container detecting arm 122, control valve 123 and limit stop 124. The container detecting arm 122 is a unitary lever pivoted about pin 125, having an elongated container engaging end and an opposite end which actuates valve 123. The length of the container engaging end is such that it reaches from one container 37 in star wheel 28 to contact the next container just entering from star wheel 36. Thus as long as the supply of containers is uninterrupted, the arm 122 remains in the position illustrated. However, in the event the supply of containers is checked and a pocket of wheel 36 approaches without a container therein, the arm 122 will rotate in a clockwise direction as shown in FIGS. 3 and 13 until the valve control end of arm 122 strikes stop 124. Rotation of the arm 122 in this direction is accomplished by low pressure air at a pressure preferably of about 10 p.s.i. applied to control valve 123 through end connection 126. Control valve 123 is a conventional spool valve, having a hollow cylinder which receives a ported spool-like piston element movable to either of two positions. In one position high pressure air (preferably about 100 p.s.i.) entering control valve 123 through connection 127 is conducted to outlet connection 128. In the other position of the spool the high pressure air is conducted to outlet connection 129. Connection 130 is an exhaust line connection, and the internal construction of the spool-like cylinder is such that when 127 is connected to 128, connections 129 and 130 are connected. Conversely, with the piston in the other position, 127 and 129 are connected and connection 128 is connected to the exhaust connection 130.

Conduits (not shown) extend from connections 128 and 129 to opposite ends of air cylinder 81 in the valve lifting assembly, and thus, according to the position of control valve 123, the cylinder 81 is actuated either to move the chute cam 86 to the raised position of FIG. 8 or the lowered position of FIG. 9. By appropriate connections the chute cam 86 is moved up when arm 122 detects containers 37 in wheel 28 and down when a container is not present. Thus, the associated filling valve assembly 57 corresponding to a particular pocket of wheel 28 is not raised if a container is not present in such pocket, for the cam roller 61 of that valve will not be elevated by valve raising assembly 75. Moreover, if the roller 61 has been partially raised due to partial passage through chute cam 86 at the time when control valve 123 is actuated, the air cylinder 81 will have its air supply reversed and will drive chute cam 86 downwardly carrying roller 61 with it to the lowered valve position.

As is shown in FIG. 14 a piston rod 131 extends outwardly from the end of valve 123 and engages the end of arm 122. This rod 131 is attached to the spool-like piston (not shown) within valve 132 and transmits the pressure of low pressure air from line 126 applied to the end of the spool-like piston to arm 122. Thus arm 122 is continually biased toward containers 37 and will move readily in a counter clockwise direction when free to do so as is the case when a pocket of star wheel 28 is empty.

*The Operation*

The operation of the individual assemblies has been outlined in considerable detail above. It is helpful, however, in order to have a clear understanding of the invention to set forth the overall operation of the filling machine and the various assemblies, particularly in the event of certain malfunctioning of filler.

Assuming the filling machine has been in operation with a full supply of both containers 37 and product 32, the individual pistons 44 reciprocate once each revolution of the reservoir 31 and with each reciprocation pump a measured volume of product 32 into the waiting containers 37 which are supplied to the pockets of star wheel 28 beneath filling nozzles 54. The desired pumping action is achieved by reciprocating each valve assembly 57 in timed sequence with the pistons 44 so that just as each piston 44 is about to start its downward stroke the associated valve assembly is lifted to the raised position, closing port 55 leading to reservoir 31 and opening nozzle 54 to permit discharge from cylinder 43 into waiting container 37. The lifting of the valve assemblies 57 will occur at the proper time because chute cam 86 is in the raised position, containers being detected by arm 122 which controls the supply of high pressure air to cylinder 81 operating the chute cam 86.

As each piston 44 completes its downward stroke, the associated valve assembly 57 is lowered by the action of the lowering cam 105 and the associated nozzle 54 is closed by valve extension 56. At the same time port 55 leading to reservoir 31 is opened so that a measured quantity of product 32 may flow into the space beneath piston 44 as the piston is raised. During the time the piston 44 is being raised the filled container 37 leaves star wheel 28 by conveyor 40 and is replaced by an empty container 37 fed into star wheel 28 from feed star 36. Since the presence of this container is detected by arm 122 the control valve 123 is not moved and the operation continues as described.

Assume, however, that an empty container is not supplied to a pocket of star wheel 28. Immediately arm 122 moves in a clockwise direction and moves control valve 123 to reverse the air connections to air cylinder 81. The piston of this cylinder 81 is then driven downwardly carrying cam chute 86 with it, and thereby the roller 61 associated with the valve assembly 57 disposed above the vacant pocket in star wheel 28 is not raised. When this roller remains down, the valve assembly 57 remains lowered and nozzle 54 continues to be closed. Thus as piston 44 moves down, the product beneath it is simply pumped back into reservoir 31 through passageway 50 and port 55 and is not discharged into the vacant pocket. When the valve assembly 57 which has not been raised reaches the valve lowering mechanism 76, being already in the lowered position, no action occurs and the product to be filled may be drawn into cylinder 43 by action of piston 44. When valve assembly 57 again reaches the valve raising mechanism 75, if a container 37 is still not present in the associated pocket of wheel 28, the action will be repeated. On the other hand, if a container 37 is present in the pocket, its presence will be detected by arm 122, chute cam 86 will be raised and normal operation will be resumed.

Should the filling machine be operating normally and a valve assembly 57 should become jammed or stuck in lowered position, product will not flow out through nozzle 54 so long as the valve assembly 57 remains lowered. The valve lowering mechanism 76 will have no effect since the valve is lowered. The valve raising mechanism 75 will attempt to raise the valve through the action of chute cam 86 but may not exert sufficient force to do so. In such event the only consequence will be compression of air in air cylinder 86 as the chute cam is pulled downwardly against the air pressure, and this will not result in damage to the filler.

If a valve should stick in a partly raised position as would be the case if a particle of metal were jammed in nozzle 54, the valve assembly may not be high enough to actuate switch 111 and shut off the machine. In such event the associated roller 61 will enter the wide inlet end portion of chute cam 86, and if the roller so enters, it will merely overcome the air pressure in cylinder 81 as it passes through the chute cam regardless of whether chute cam is in the raised or lowered position. This action will not damage the filling machine.

The action of the apparatus when a fully raised valve is jammed or stuck has been fully described above in the section headed Valve Lowering Mechanism.

From the foregoing it will be obvious that a greatly improved valve control mechanism for rotary filling machines has been provided, which mechanism is foolproof in operation even at very high filling speeds, is simply constructed and otherwise fulfills the objects of this invention.

Various changes and modifications, in addition to those suggested herein and such as will present themselves to those familiar with the art, may be made without departing from the spirit of this invention whose scope is commensurable with the following claims.

What is claimed as new and is desired to be secured by Letters Patent of the United States is:

1. A filling machine having a plurality of filling outlets overlying and movable along a path in synchronism with a plurality of container receiving pockets, comprising a common reservoir for material; means associated with each of said filling outlets comprising, a filler control valve including a stem longitudinally reciprocable between two positions, a cylinder, the longitudinal axis of which is in parallel relationship to said valve stem, a path communicating said cylinder with said reservoir and said outlet, and a reciprocable piston in said cylinder, means for automatically reciprocating said piston for pumping a measured quantity of material into a container beneath its associated filling outlet; each said filler control valve including a cam follower connected thereto, holding means for yieldingly retaining each filler control valve in a fixed longitudinal position, a camming surface normally inclined in the path of each said cam follower for effecting longitudinal movement of each said control valve from a first longitudinal position to a second longitudinal position, said camming surface being movable from said inclined position to a position relative to said cam followers ineffective for effecting longitudinal movement of each said valve member, a second cam spaced from and inclined oppositely to said normally inclined camming surface for engaging each said cam follower and restoring each of said control valves from said second longitudinal position to said first longitudinal position, said first longitudinal position of each filler control valve closing said outlet and opening said path communicating said cylinder with said reservoir, and said second longitudinal position of each said filler control valve opening said outlet and closing said path communicating said cylinder and reservoir, detection means for determining the presence or absence of an individual empty container beneath the outlet of a particular filling outlet, and cylinder means pressure activated responsive to said detection means for controlling the relative position of said camming surface so that it is moved into its inclined position only at such times as there is a container disposed beneath the particular filling outlet and for moving said camming surface to its ineffective position only at such times as there is no container disposed beneath the particular filling outlet for maintaining the particular filling outlet closed while porting the associated cylinder to the reservoir to relieve pressure within said cylinder from the automatic action of said piston on the measured quantity of material therein.

2. A filling machine as claimed in claim 1, in which said machine is a rotary filler, adapted to receive a line of containers and fill same while being conducted around a circular path beneath said plurality of rotating filling outlets, said movable camming surface and said second cam being positioned diametrically opposite, one from another, on said circular path.

3. A filling machine as claimed in claim 1, in which said second-mentioned cam for restoring said filler valves is resiliently biased into its inclined position, said bias being sufficient to overcome the force exerted on each filler control valve by said holding means, but insufficient not to yield in the event said reciprocable filler valve should become lodged.

4. A filling machine as claimed in claim 3, including a microswitch positioned to be actuated in the event said resiliently biased second-mentioned cam is forced to yield by the cam follower of a lodged filler valve, said microswitch upon actuation being adapted to halt rotation of said machine before said lodged filler valve reaches said first-mentioned camming surface.

5. A filler machine as claimed in claim 1, in which said cylinder means is a fluid actuated cylinder and piston which when pressurized holds said movable camming surface in its inclined position, said detection means upon detecting no container beneath a filling outlet, or a failure of said pressurizing fluid effecting depressurization of said cylinder, thus releasing said camming surface from its inclined position whereby in any instance the device will "fail safe."

6. A filling machine having a plurality of filling outlets overlying and movable along a path in synchronism with a plurality of container receiving pockets, comprising a common reservoir for material, means associated with each of said filling outlets comprising a filler control valve including a stem longitudinally reciprocable between two positions, a cylinder the longitudinal axis of which is in parallel relationship to said valve stem, a path communicating each said cylinder with said reservoir and each said outlet and a reciprocal piston in said cylinder, means for automatically reciprocating said piston for pumping a measured quantity of material into a container beneath its associated filling outlet, each said filler control valve including a cam follower connected thereto, a camming surface inclined in the path of each said cam follower for effecting longitudinal movement of each said control valve from a first longitudinal position to a second longitudinal position, said camming surface including means comprising a chute of U-shaped cross section pivotally mounted at one end and adapted and advanced to prevent longitudinal movement of the cam followers beyond that corresponding to the inclination of said chute, said ineffective position being horizontal and said effective position being inclined in the path of said cam followers, detection means for determining the presence or absence of an individual empty container beneath a particular filling outlet, and cylinder means operatively responsive to said detection means for controlling the relative position of said camming surface so that it is moved into its inclined position only at such times as there is a container disposed beneath the particular filling outlet and for moving said camming surface to its ineffective position only at such times as there is no container disposed beneath the particular filling outlet for maintaining the particular filling outlet closed while porting the associated cylinder to the reservoir to release pressure within said cylinder from the automatic action of said piston on the measured quantity of material therein.

References Cited in the file of this patent
UNITED STATES PATENTS

| | | |
|---|---|---|
| 1,468,254 | Ayars | Sept. 18, 1923 |
| 1,956,595 | Schmidt | May 1, 1934 |
| 2,137,389 | Chapman | Nov. 22, 1938 |
| 2,666,564 | Minard | Jan. 19, 1954 |
| 2,684,804 | Huntar et al. | July 27, 1954 |
| 2,759,649 | Stigler | Aug. 21, 1956 |
| 2,768,568 | Galloway | Oct. 30, 1956 |
| 2,770,397 | Galloway | Nov. 13, 1956 |
| 2,789,589 | Fechheimer | Apr. 23, 1957 |
| 2,815,046 | McBean et al. | Dec. 3, 1957 |